(12) United States Patent
Hunt et al.

(10) Patent No.: US 9,880,322 B2
(45) Date of Patent: Jan. 30, 2018

(54) BENZYL (METH)ACRYLATE MONOMERS SUITABLE FOR MICROSTRUCTURED OPTICAL FILMS

(75) Inventors: Bryan V. Hunt, Nowthen, MN (US); Kyle J. Lindstrom, Houlton, WI (US); Maureen C. Nelson, West St. Paul, MN (US)

(73) Assignee: 3M INNOVATIVE PROPERTIES CO., St. Paul, MN (US)

( * ) Notice: Subject to any disclaimer, the term of this patent is extended or adjusted under 35 U.S.C. 154(b) by 0 days.

(21) Appl. No.: 13/985,058

(22) PCT Filed: Apr. 25, 2012

(86) PCT No.: PCT/US2012/034872
§ 371 (c)(1),
(2), (4) Date: Aug. 13, 2013

(87) PCT Pub. No.: WO2012/158317
PCT Pub. Date: Nov. 22, 2012

(65) Prior Publication Data
US 2014/0058038 A1    Feb. 27, 2014

Related U.S. Application Data

(60) Provisional application No. 61/485,853, filed on May 13, 2011.

(51) Int. Cl.
| | | |
|---|---|---|
| G02B 1/04 | (2006.01) | |
| C08F 220/18 | (2006.01) | |
| C08J 7/16 | (2006.01) | |
| C09D 133/06 | (2006.01) | |

(52) U.S. Cl.
CPC .............. *G02B 1/04* (2013.01); *C08F 220/18* (2013.01); *C08J 7/16* (2013.01); *C09D 133/06* (2013.01)

(58) Field of Classification Search
CPC ..... C08K 3/22; C08K 2201/011; C08L 33/14; G02B 1/04; C08F 220/18; C09D 33/06; C09D 133/06; C08J 7/16
USPC .................. 524/413, 558, 561, 783
See application file for complete search history.

(56) References Cited

U.S. PATENT DOCUMENTS

| | | |
|---|---|---|
| 4,576,850 A | 3/1986 | Martens |
| 5,175,030 A | 12/1992 | Lu |
| 5,183,597 A | 2/1993 | Lu |
| 5,783,120 A | 7/1998 | Ouderkirk |
| 5,825,543 A | 10/1998 | Ouderkirk |
| 5,828,488 A | 10/1998 | Ouderkirk |
| 5,882,774 A | 3/1999 | Jonza |
| 6,111,696 A | 8/2000 | Allen |
| 6,620,946 B2 | 9/2003 | Dershem |
| 6,864,019 B2 | 3/2005 | Hegel |
| 6,963,001 B2 | 11/2005 | Dershem |
| 7,074,463 B2 | 7/2006 | Jones |
| 7,241,437 B2 | 7/2007 | Davidson |
| 2005/0148725 A1 | 7/2005 | Statz |
| 2008/0221291 A1 | 9/2008 | Invie |
| 2009/0017256 A1 | 1/2009 | Hunt |
| 2009/0270576 A1 | 10/2009 | Hunt |
| 2009/0275720 A1 | 11/2009 | Hunt |
| 2010/0003501 A1* | 1/2010 | Liu et al. ............... 428/327 |
| 2010/0048802 A1 | 2/2010 | Hunt |
| 2011/0086972 A1 | 4/2011 | Hunt |

FOREIGN PATENT DOCUMENTS

| | | |
|---|---|---|
| JP | H04-178976 | 6/1992 |
| JP | 6134772 | 5/1994 |
| JP | 9025438 | 1/1997 |
| JP | 2889593 | 2/1999 |
| JP | 2889593 B * | 5/1999 |
| JP | 2008-120605 | 5/2008 |
| JP | 2010-126670 | 6/2010 |
| JP | 2010-248358 | 11/2010 |
| WO | WO 2008/112452 | 9/2008 |
| WO | WO 2010/64726 | 6/2010 |
| WO | WO 2010/074862 | 7/2010 |
| WO | WO 2010/113600 | 10/2010 |
| WO | WO 2014/046837 | 3/2014 |

OTHER PUBLICATIONS

JP 2889593 B (1999), machine translation, JPO Advanced Industrial Property Network (AIPN).*
JP 2010-248358 A (2010), machine translation, JPO/INPIT Japan Platform for Patent Information (J-PlatPat).*
International Search Report PCT/US2012/034872 dated Nov. 23, 2012, 4 pgs.
Supplementary European Search Report; EP 12 78 5422; dated Jun. 5, 2015; 2 pgs.

* cited by examiner

*Primary Examiner* — Josephine L Chang
(74) *Attorney, Agent, or Firm* — Carolyn A. Fischer

(57) ABSTRACT

Presently described are optical films comprising a polymerized (e.g. microstructured) surface that comprises the reaction product of a polymerizable resin composition and polymerizable resin compositions that comprise nanoparticles; at least one first monomer comprising at least two (meth)acrylate groups; and at least one second (meth)acrylate monomer having following the structure (I); wherein at least one R1 comprises an aromatic substituent, t is an integer from 1 to 4, and R2 is hydrogen or methyl.

(I)

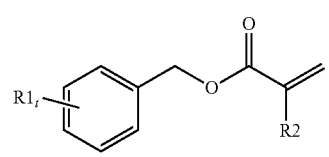

10 Claims, No Drawings

BENZYL (METH)ACRYLATE MONOMERS SUITABLE FOR MICROSTRUCTURED OPTICAL FILMS

CROSS REFERENCE TO RELATED APPLICATIONS

This application is a national stage filing under 35 U.S.C. 371 of PCT/US2012/034872, filed Apr. 25, 2012, which claims priority to provisional Application No. 61/485,853, filed May 13, 2011, the disclosure of which is incorporated by reference in their entirety herein.

BACKGROUND

Certain microstructured optical products, such as described in U.S. 2005/0148725, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from polymerizable resin compositions comprising high index of refraction monomers that are cured or polymerized. Halogenated (e.g. brominated) monomers or oligomers are often employed to attain refractive indices of for example 1.56 or greater. Another way to attain high refractive index compositions is to employ a polymerizable composition that comprises high refractive index nanoparticles.

One common monomer that has been employed as a reactive diluent in polymerizable resin compositions is phenoxyethyl acrylate, having a refractive index of 1.517 and a viscosity of 12 cps at 25° C.

Other monomers for use in microstructured optical films have been described in U.S. Publication Nos. US2010/0048802, US2009/0275720, and US2009/0270576.

SUMMARY

Presently described are optical films comprising a polymerized (e.g. microstructured) surface that comprises the reaction product of a polymerizable resin composition comprising nanoparticles; at least one first monomer comprising at least two (meth)acrylate groups; and at least one second (meth)acrylate monomer having the structure

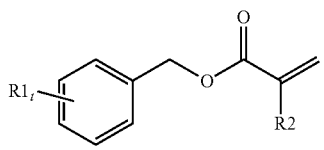

Formula 1 wherein at least one R1 comprises an aromatic substituent, t is an integer from 1 to 4; and
R2 is hydrogen or methyl.

Also described are polymerizable resin compositions comprising benzyl (meth)acrylate monomers and nanoparticles.

DETAILED DESCRIPTION

Presently described are (e.g. microstructured) optical films prepared from polymerizable resin compositions.

The polymerized microstructure can be an optical element or optical product constructed of a base layer and a polymerized microstructured optical layer. The base layer and optical layer can be formed from the same or different polymeric material. One preferred optical film having a polymerized microstructured surface is a brightness enhancing film.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The brightness enhancing film of the invention generally comprises a (e.g. preformed polymeric film) base layer and an optical layer. The optical layer comprises a linear array of regular right prisms. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

As described in Lu et al., U.S. Pat. No. 5,175,030, and Lu, U.S. Pat. No. 5,183,597, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

In some embodiments, the polymerizable resin composition comprises surface modified inorganic nanoparticles. In such embodiments, "polymerizable composition" refers to the total composition, i.e. the organic component and surface modified inorganic nanoparticles. The "organic component" refers to all of the components of the composition except for the inorganic nanoparticles. The surface treatments are generally adsorbed or otherwise attached to the surface of the inorganic nanoparticles. When the composition is free of inorganic materials such as surface modified inorganic nanoparticles the polymerizable resin composition and organic component are one in the same.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). Solvent concentrations of less than 0.5 wt-% are preferred.

The components of the organic component are preferably chosen such that the polymerizable resin composition has a low viscosity. In some embodiments, the viscosity of the organic component is less than 1000 cps and typically less than 900 cps at the coating temperature. The viscosity of the organic component may be less than 800 cps, less than 700 cps, less than 600 cps, or less than 500 cps at the coating temperature. As used herein, viscosity is measured (at a shear rate up to 1000 sec−1) with 25 mm parallel plates using a Dynamic Stress Rheometer. Further, the viscosity of the organic component is typically at least 10 cps, more typically at least 50 cps at the coating temperature.

The coating temperature typically ranges from ambient temperature, 77° F. (25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component, as well as the second (meth)acrylate monomer of Formula 1, are preferably a liquid at ambient temperature.

The second (meth)acrylate monomer described herein, as well as the organic component has a refractive index of at least 1.50, 1.51, 1.52, 1.53, 1.54, 1.55, 1.56. The polymerizable composition including high refractive index nanoparticles can have a refractive index as high as 1.70. (e.g. at least 1.61, 1.62, 1.63, 1.64, 1.65, 1.66, 1.67, 1.68, or 1.69). High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning calorimetry (DSC), modulated DSC, or Dynamic Mechanical Analysis. The polymerizable composition can be polymerized by conventional free radical polymerization methods.

The presently described optical films are prepared from a polymerizable resin composition comprising a benzyl monomer having the structure

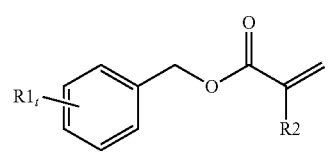

Formula 1 wherein at least one R1 comprises an aromatic substituent, t is an integer from 1 to 4; and
R2 is hydrogen or methyl.

R1 may comprise various aromatic substituents such as

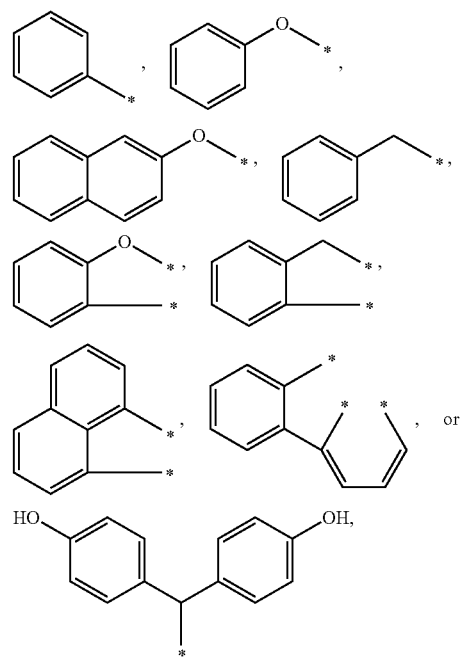

The aromatic substituent R1 is generally bonded to the aromatic ring of the benzyl group by at least one divalent (e.g. alkylene or ether) linking group. Hence, the aromatic ring of R1 is typically not fused to the aromatic benzyl ring, as in the case of naphthyl. In some embodiments, the aromatic substituent R1 is bonded to the aromatic benzyl ring by two or more divalent (e.g. alkylene or ether) linking groups.

In some favored embodiments, t is 1. Representative structures include

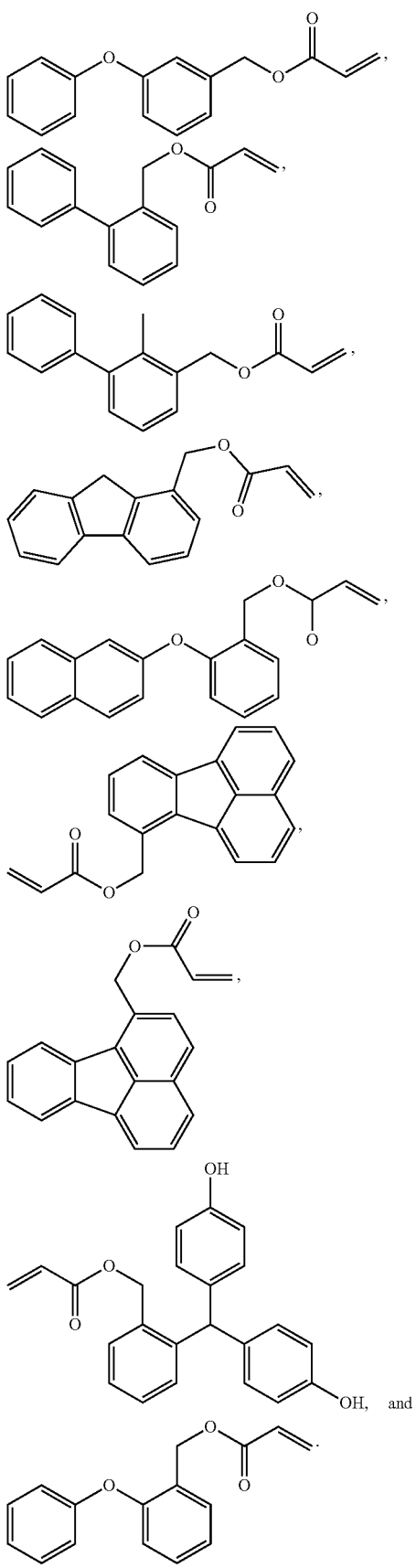

In other embodiments, t is greater than 1. In one embodiment, t is 3. One representative structure is

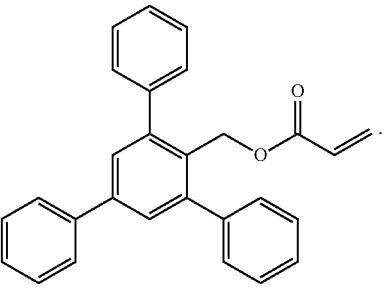 [SMILES: C=CC(=O)OCc1c(-c2ccccc2)cc(-c2ccccc2)cc1-c1ccccc1]

Various aromatic alcohols from Sigma-Aldrich are available as starting materials that can be converted to acrylates by reacting such materials with acrylic acid.

The amount of such benzyl (meth)acrylate monomer employed in the polymerizable resin composition can vary. A small concentration, for example 1 wt-%, 2 wt-%, 3 wt-%, 4 wt-%, or 5 wt-% may be substituted for a portion of a lower refractive index component(s) in order to raise the refractive index of the polymerizable resin composition. In other embodiments, the total polymerizable resin composition (i.e. inclusive of the nanoparticles) comprises at least 10 wt-%, 15 wt-%, 20 wt-%, or 25 wt-% of one or more benzyl (meth)acrylate monomers according to Formula I.

The polymerizable resin composition typically comprises one or more of the second (meth)acrylate monomers according to Formula I in combination with at least 5% and up to 10 wt-%, 15 wt-%, 20 wt-%, or 30 wt-% of one or more first monomers or oligomers having at least two polymerizable (meth)acrylate groups.

A variety of first monomers and/or oligomers having at least two polymerizable (meth)acrylate groups may be employed.

Various difunctional (meth)acrylate monomers are known in the art, including for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, neopentyl glycol diacrylate, polyethylene glycol diacrylate, (Mn=200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

In some embodiments that first monomer and/or oligomers having at least two polymerizable (meth)acrylate groups is an aromatic monomer and may comprise at least two aromatic rings. The molecular weight of the first aromatic monomer is typically at least 350 g/mole, 400 g/mole, or 450 g/mole.

The first monomer or oligomer having at least two polymerizable (meth)acrylate groups may be synthesized or purchased. The first monomer or oligomer typically contains a major portion, i.e. at least 60-70 wt-%, of a specific structure. It is commonly appreciated that other reaction products are also typically present as a byproduct of the synthesis of such monomers.

In some embodiments, the polymerizable composition comprises at least one second (meth)acrylate monomer according to Formula 1 and at least one first (optionally brominated) difunctional (meth)acrylate monomer that comprises a major portion having the following general structure:

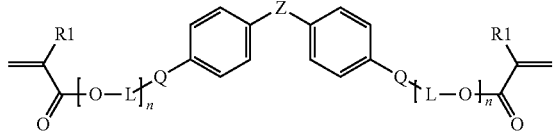

wherein Z is independently —C(CH$_3$)$_2$—, —CH$_2$—, —C(O)—, —S—, —S(O)—, or —S(O)$_2$—, each Q is independently O or S. L is a linking group. L may independently comprise a branched or linear C$_2$-C$_{12}$ alkylene group and n ranges from 0 to 10. L preferably comprises a branched or linear C$_2$-C$_6$ alkylene group. More preferably L is C$_2$ or C$_3$ and n is 0, 1, 2 or 3. The carbon chain of the alkylene linking group may optionally be substituted with one or more hydroxy groups. For example L may be —CH$_2$CH(OH)CH$_2$—. Typically, the linking groups are the same. R1 is independently hydrogen or methyl.

In some embodiments, the first monomer is a bisphenol di(meth)acrylate, i.e. the reaction product of a bisphenol A diglycidyl ether and acrylic acid. Although bisphenol A diglycidyl ether is generally more widely available, it is appreciated that other biphenol diglycidyl ether such as bisphenol F diglycidyl ether could also be employed. For example, the di(meth)acrylate monomer can be the reaction product of Tetrabromobisphenol A diglycidyl ether and acrylic acid. Such monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy(2-hydroxy-3,1-propanediyl)]ester.

One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

Alternatively or in addition to, the organic component may comprise one or more (meth)acrylated aromatic epoxy oligomers. Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN112C60". One exemplary aromatic epoxy acrylate is commercially available from Sartomer under the trade designation "CN 120" (reported by the supplier to have a refractive index of 1.5556, a viscosity of 2150 at 65° C., and a Tg of 60° C.).

In some embodiments, the polymerizable resin composition comprises at least one second (meth)acrylate monomer of Formula 1 and at least one (e.g. difunctional) biphenyl (meth)acrylate monomer that comprises a major portion having the following general structure:

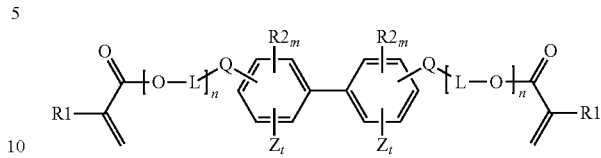

wherein each R1 is independently H or methyl;
each R2 is independently Br;
m ranges from 0 to 4;
each Q is independently O or S;
n ranges from 0 to 10;
L is a C2 to C12 alkylene group optionally substituted with one or more hydroxyl groups;
z is an aromatic ring; and
t is independently 0 or 1.

In some aspects, Q is preferably O. Further, n is typically 0, 1 or 2. L is typically C$_2$ or C$_3$. Alternatively, L is typically a hydroxyl substituted C$_2$ or C$_3$. In some embodiments, z is preferably fused to the phenyl group thereby forming a binapthyl core structure.

Preferably, at least one of the -Q[L-O]n C(O)C(R1)=CH$_2$ groups is substituted at the ortho or meta position. More preferably, the biphenyl di(meth)acrylate monomer comprises a sufficient amount of ortho and/or meta (meth)acrylate substituents such that the monomer is a liquid at 25° C. In some embodiments, each (meth)acrylate group containing substituent is bonded to an aromatic ring group at an ortho or meta position. It is preferred that the biphenyl di(meth)acrylate monomer comprises a major amount of ortho (meth)acrylate substituents (i.e. at least 50%, 60%, 70%, 80%, 90%, or 95% of the substituents of the biphenyl di(meth)acrylate monomer). In some embodiments, each (meth)acrylate group containing substituent is bonded to an aromatic ring group at an ortho or meta position. As the number of meta- and particularly para-substituents increases, the viscosity of the organic components can increase as well. Further, para-biphenyl di(meth)acrylate monomers are solids at room temperature, with little solubility (i.e. less than 10%), even in phenoxyethyl acrylate and tetrahydrofurfuryl acrylate.

Such biphenyl monomers are described in further detail in U.S. Publication No. US2008/0221291. Other biphenyl di(meth)acrylate monomer are described in the literature.

In yet other embodiments, the polymerizable resin composition comprises at least one second (meth)acrylate monomer of Formula 1 and at least one (e.g. difunctional) fluorene (meth)acrylate monomer that comprises a major portion having the following general structure:

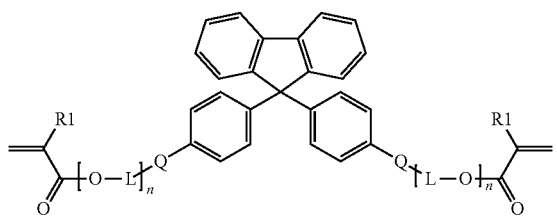

wherein each Q is independently O or S. L is a divalent linking group. L may independently comprise a branched or linear $C_2$-$C_{12}$ alkylene group and n ranges from 0 to 10. L preferably comprises a branched or linear $C_2$-$C_6$ alkylene group. More preferably L is $C_2$ or $C_3$ and n is 0, 1, 2 or 3. The carbon chain of the alkylene linking group may optionally be substituted with one or more hydroxy groups. For example L may be —CH$_2$CH(OH)CH$_2$—. Typically, the linking groups are the same. R1 is independently hydrogen or methyl.

In some favored embodiments, the second monomer of Formula 1 is sufficiently low in viscosity at 25° C. such that the monomer functions are reactive diluents for the (higher viscosity) aromatic monomer or oligomer comprising at least two (meth)acrylate group. The viscosity of the monomer of Formula 1 may be less than 100 cps, or 75 cps, or 50 cps, or 25 cps at 25° C.

In some embodiments, one or more benzyl monomers of Formula 1 are the sole reactive dilent and the polymerizable composition is free of other mono(meth)acrylate monomers. However, in other embodiments, the polymerizable resin composition comprises other monofunctional diluents in combination with the benzyl monomers of Formula 1.

Aromatic (e.g. monofunctional) (meth)acrylate monomers typically comprise a phenyl, cumyl, biphenyl, or napthyl group. Preferred diluents can have a refractive index greater than 1.50, 1.51, 1.52, 1.53, 1.54, or 1.55. Such reactive diluents can be halogenated, non-brominated, or non-halogenated.

Suitable monomers include phenoxy (meth)acrylates such as phenoxyethyl (meth)acrylate, phenoxy-2-methylethyl (meth)acrylate, phenoxyethoxyethyl (meth)acrylate; or 3-hydroxy-2-hydroxypropyl(meth)acrylate; or phenyl(meth)acrylate; or phenylthio (meth)acrylates such as phenylthio ethyl acrylate; or napthyl(meth)acrylates such as 2-naphthylthio ethyl acrylate, 1-naphthylthio ethyl acrylate, naphthyloxy ethyl acrylate, 2-naphthyloxy ethyl acrylate; or benzyl (meth)acrylate, as well an monofunctional biphenyl monomer(s).

In some favored embodiments, the reactive diluents lack naphthyl groups or sulfur atoms, as such monomers can cause yellowing.

In some embodiments, the polymerizable compositions comprise one or more monofunctional biphenyl monomer(s).

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio (meth)acrylate monomer may further comprise a (e.g. 1 to 5 carbon) alkyl group optionally substituted with one or more hydroxyl groups. An exemplary species of this type is 2-phenyl-2-phenoxyethyl acrylate.

In one embodiment, a monofunctional biphenyl(meth) acrylate monomer is employed having the general structure:

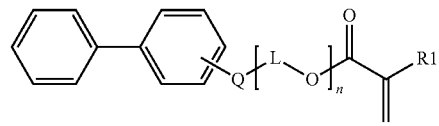

wherein
R1 is H or CH$_3$;
Q is O or S;
n ranges from 0 to 10 (e.g. n is 1, 2, 3, 4, 5, 6, 7, 8, 9, or 10); and
L is preferably an alkylene group having 1 to 5 carbon atoms (i.e. methylene, ethylene, propylene, butylene, or pentylene), optionally substituted with hydroxy.

In another embodiment, the monofunctional biphenyl (meth)acrylate monomer has the general structure:

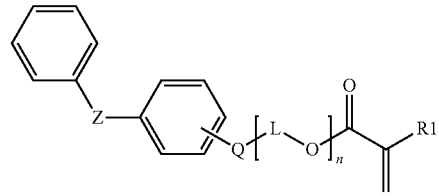

wherein
R1 is H or CH$_3$;
Q is O or S;
Z is selected from —(C(CH$_3$)$_2$—, —CH$_2$, —C(O)—, —S(O)—, and —S(O)$_2$—;
n ranges from 0 to 10 (e.g. n is 1, 2, 3, 4, 5, 6, 7, 8, 9, or 10); and
L is an alkyl group having 1 to 5 carbon atoms (i.e. methylene, ethylene, butylene), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", and 2-phenyl-2-phenoxyethyl acrylate, available under the trade designation "TO-1463".

The polymerizable resin composition may also optionally comprise up to 20 wt-% of a non-aromatic crosslinker that comprises at least three (meth)acrylate groups. Suitable crosslinking agents include for example pentaerythritol tri (meth)acrylate, pentaerythritol tetra(meth)acrylate, trimethylolpropane tri(methacrylate), dipentaerythritol penta(meth) acrylate, dipentaerythritol hexa(meth)acrylate, trimethylolpropane ethoxylate tri(meth)acrylate, glyceryl tri (meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

However, in some favored embodiments, particularly those containing at least 30 wt-%, 35 wt-%, or 40 wt-% or (e.g. zirconia) nanoparticles, the polymerizable resins comprises little (e.g. no greater than 5 wt-%) or no crosslinker.

In some embodiments, it is preferred that the polymerized microstructured surface of the optical film, the polymerizable resin composition, and the second (meth)acrylate monomer of Formula 1, are substantially free (i.e. contain less than 1 wt-%) of bromine. In other embodiments, the total amount of bromine in combination with chlorine is less than 1 wt-%. In some aspects, the polymerized microstructured surface or the optical film, the polymerizable resin composition, and the second (meth)acrylate monomer of Formula 1 are substantially non-halogenated (i.e. contains less than 1 wt-% total of bromine and chlorine).

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The second (meth)acrylate monomers of Formula 1 described herein are particularly useful in preparing non-halogenated high refractive index polymerizable organic compositions. The polymerizable composition further comprises inorganic nanoparticles.

Surface modified (e.g. colloidal) nanoparticles can be present in the polymerized structure in an amount effective to enhance the durability and/or refractive index of the article or optical element. In some embodiments, the total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). The nanoparticles can include metal oxides such as, for example, alumina, zirconia, titania, mixtures thereof, or mixed oxides thereof. Such nanoparticles have a refractive index of at least 1.60. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in U.S. Pat. No. 7,241,437. The nanoparticles are surface modified. Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. The addition of the high refractive index surface-modified nanoparticles, such as zirconia, can increase the gain of brightness enhancement film compared to films that contain only polymerized organic material.

The monocarboxylic acid surface treatments preferably comprise a compatibilizing group. The monocarboxylic acids may be represented by the formula A-B where the A group is a (e.g. monocarboxylic acid) group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) optical article. The compatibilizing group B can be reactive or nonreactive and can be polar or non-polar.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

The compatibilizing group B may optionally be reactive such that it can copolymerize with the organic matrix of the (e.g. brightness enhancing) optical article. For instance, free radically polymerizable groups such as (meth)acrylate compatibilizing groups can copolymerize with (meth)acrylate functional organic monomers to generate brightness enhancement articles with good homogeneity.

Favored zirconia sols and surface treatments are described in WO2010/074862.

The surface modified particles can be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in the U.S. Pat. No. 7,074,463. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns, which can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed component suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

A common way of measuring the effectiveness of such recycling of light is to measure the gain of an optical film. As used herein, "relative gain", is defined as the on-axis luminance, as measured by the test method described in the examples, when an optical film (or optical film assembly) is placed on top of the light box, relative to the on-axis luminance measured when no optical film is present on top of the light box. This definition can be summarized by the following relationship:

Relative Gain=(Luminance measured with optical film)/(Luminance measured without optical film)

In one embodiment, an optical film comprising a light transmissive (e.g. cured) polymeric material having a microstructured surface is described. The optical film is a substantially non-polarizing film having a single sheet relative gain of at least 1.60. The relative single sheet gain is typically no greater than 2.05. Accordingly, the single sheet relative gain may also range from any values in the set of relative gain values including 1.65, 1.70, 1.75, 1.80, 1.85, and 1.90 or greater.

In other embodiments, various assemblies or "stack" of optical films are described that comprise or consist of two or more films. Each assembly includes a first microstructured optical film proximate a second (e.g. microstructured or unstructured) optical film.

By proximate, it is meant sufficiently near. Proximate can include the first microstructured optical film being in contact with the second optical film such as by the films merely being stacked together or the films may be attached by various means. The films may be attached by mechanical means, chemical means, thermal means, or a combination thereof. Chemical means includes various pressure sensitive, solvent-based, and hot melt adhesives as well as two-part curable adhesive compositions that crosslink upon exposure to heat, moisture, or radiation. Thermal means includes for example a heated embossed roller, radio frequency (RF) welding, and ultrasonic welding. The optical films may be attached (e.g. continuously) across the entire plane of the films, at only select points, or at only the edges. Alternatively, the proximate optical films may be separated from each other with an air interface. The air interface may be created by increasing the thickness of either or both optical films at the periphery, such as by application of an adhesive. When the films are stacked rather than laminated together, the air interface between the optical films may be only a few microns.

In some embodiments, a first microstructured optical film is proximate a second microstructured optical film. In such assemblies, the microstructured surface of the bottom film is preferably disposed proximate the unstructured surface of the top film. For embodiments that employ prismatic microstructured films, the prisms of the films are generally aligned parallel in one principal direction, the prisms being separated by grooves. It is generally preferred to align the prisms (or grooves) of the second (e.g. bottom) microstructured optical film in a stack such that the prisms are substantially orthogonal to the prisms of the first (e.g. top) film. However, other alignments can also be employed. For example, the prisms of the second optical film may be positioned relative to the prisms of the second optical film such that the intersection of grooves or prisms form angles ranging from about 70° to about 120°.

In one embodied assembly, a first microstructured substantially non-polarizing optical film is proximate a second microstructured substantially non-polarizing optical film. The gain of this assembly is at least 2.50. The first optical film may be the same as or different than the second optical film. For example, the second film may have a different base layer composition, a different microstructured surface composition, and/or may have a different surface microstructure. The relative gain of this assembly is typically less than 3.32. Accordingly, the relative gain of such assembly may also range from any values in the set of relative gain values including 2.55, 2.60, 2.65, 2.70, 2.75, 2.80, 2.85, 2.90, or greater.

For the following defined terms, these definitions shall be applied, unless a different definition is given in the claims or elsewhere in this specification.

The term "microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer or Bausch and Lomb Refractometer (CAT No. 33.46.10) in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

"Aggregation" refers to a strong association between primary particles that may be chemically bound to one another. The breakdown of aggregates into smaller particles is difficult to achieve.

"Agglomeration refers to a weak association between primary particles which may be held together by charge or polarity and can be broken down into smaller entities.

"Primary particle size" refers to the mean diameter of a single (non-aggregate, non-agglomerate) particle.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

MATERIALS USED IN THE EXAMPLES

Synthesis of 3-phenoxy benzyl acrylate monomer ("PBA")

To a 500 ml 3 neck round bottom flask equipped with an overhead stirrer, temperature probe, heating mantel and dean stark trap was added 100.0 g of 3-phenoxy benzyl alcohol. 37.79 g of acrylic acid, 155.6 g of cyclohexane, 0.04050 g of 4-hydroxy TEMPO (Prostab inhibitor), 0.04050 g of 4-methoxyphenol and 1.296 g of methanesulfonic acid. The clear mixture was heated with stirring to 84 C and collected water from condensation over time. After 10 hours ~1.9% starting material remained. The reaction was washed with 15% sodium carbonate 250 ml, 3 times with 250 ml DI water, dried with MgSO4, filtered and concentrated invacuo to recover a light yellow low viscosity liquid. 115 g of 3-phenoxy benzyl acrylate (90.56% yield). The refractive index was 1.5648 and the viscosity was 16 cps at 25° C. 3-phenoxy benzyl acrylate has the following structure:

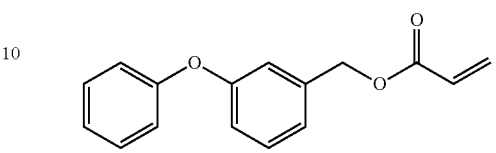

ZrO$_2$ sol was made and surface modified as described in WO2010/074862. Such surface treatment contained a mixture of the following compounds.

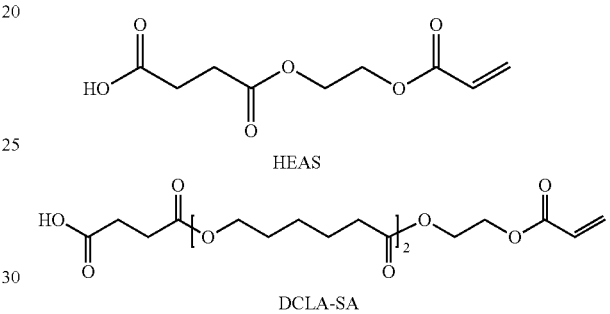

| Chemical description | Supplier/Tradename |
|---|---|
| Phenoxyl ethyl acrylate (PEA) | Available from Sartomer as "SR339" |
| 2-phenyl-phenyl acrylate (oPPA) | Available from Toagosei as "TO-2344" |
| Ethoxylated bisphenol A diacrylate | Available from Sartomer as "SR601" |
| Polymerization inhibitor | Available from Ciba Specialty Chemicals as "Prostab 5198" |
| 2,2'-diethoxy-biphenyl diacrylate (BPDA-1) | Prepared as described in US2008/0221291 |
| a 40:60 blend of A-BPEF and o-phenyl phenoxy acrylate ("oPPEA") each depicted as follows: | Available from Eternal Chemical Co., Taiwan as "EM2206" | oPPEA

A-BPEF

Composition 1

The following were added to a vessel:
90.0 parts ZrO$_2$ sol (40.8 wt-% ZrO2)
39.0 parts 1-methoxy-2-propanol
17.1 parts HEAS (50% in 1-methoxy-2-propanol)
3.9 parts DCLA-SA (50% in 1-methoxy-2-propanol)
9.6 parts PEA
6.4 parts SR601
16.1 parts oPPA (2-phenyl-phenyl acrylate)

Water and alcohol were removed via vacuum distillation, then steam was added, followed by further vacuum distillation such that the resultant composite resin dispersion was approximately:
46.3 parts ZrO$_2$
10.8 parts HEAS
2.5 parts DCLA-SA
12.2 parts PEA
8.1 parts SR601
20.3 parts oPPA (2-phenyl-phenyl acrylate)

Composition 2

The following were added to a round bottom flask:
50.0 parts ZrO$_2$ sol (41.5 wt-% ZrO2)
58 parts 1-methoxy-2-propanol
9.75 parts HEAS (50% in 1-methoxy-2-propanol)
2.37 parts DCLA-SA (50% in 1-methoxy-2-propanol)
8.96 parts PBA
2.26 parts BPDA-1
1 small flake of ProStab 5198

Water and alcohol were removed via vacuum distillation, then steam was added, followed by further vacuum distillation such that the resultant composite resin dispersion was approximately:
55.0 parts ZrO$_2$
12.8 parts HEAS
3.0 parts DCLA-SA
23.4 parts PBA
5.8 parts BPDA-1
0.005 parts Prostab5198

Composition 3

The following were added to a round bottom flask:
50.0 parts ZrO$_2$ sol (41.5 wt-% ZrO2)
67 parts 1-methoxy-2-propanol
9.80 parts HEAS (50% in 1-methoxy-2-propanol)
2.25 parts DCLA-SA (50% in 1-methoxy-2-propanol)
9.32 parts PBA
9.32 parts EM2206 (a 40:60 blend of A-BPEF and oPPEA, from Eternal Chemical Co., Taiwan)
1 small flake of ProStab 5198

Water and alcohol were removed via vacuum distillation, then steam was added, followed by further vacuum distillation such that the resultant composite resin dispersion was approximately:
46.0 parts ZrO$_2$
10.8 parts HEAS
2.5 parts DCLA-SA
20.4 parts PBA
20.4 parts EM2206
0.005 parts Prostab5198

To each polymerizable resin was added 0.36 wt % of Darocure 1173 photoinitiator and 0.40 wt % of Lucirin TPO photoinitiator.

The refractive index of each final blend was measured using a Bausch and Lomb Refractometer (CAT No. 33.46.10). The viscosity was reported at 50° C. using a AR 2000 rheometer available from TA Instruments (New Castle, Del.). The results are summarized in Table 1.

TABLE 1

Resin Composition Data

| Composition | Refractive Index | Viscosity in cp at 50° C. |
|---|---|---|
| Composition 1 | 1.626 | Not measured, about 300 |
| Composition 2 | 1.653 | 4659 |
| Composition 3 | 1.637 | 355 |

Optical Film Sample Preparation:

Brightness enhancing films samples were made using Polymerizable Resin Compositions 1-3. About 3 grams of warm resin was applied to a 2 mil primed PET (polyester) film, available from DuPont under the trade designation "Melinex 623" and placed against a microstructured tool with a 90/24 pattern similar to the commercially available Vikuiti TBEF-90/24. The PET, resin and tool were passed through a heated laminator set at approximately 150° F. to create a uniformly thick sample. The tool containing the film and coated resin sample was passed at 50 fpm through a Fusion UV processor containing two 600 W/10 in D-bulbs to cure the film. The PET and cured resin were removed from the tool and cut into samples. The test methods used to evaluate the films are as follows:

Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m$^2$. The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources.

Relative Gain=(Luminance measured with optical film)/(Luminance measured without optical film)

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1−$R$sphere*$R$standard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1−$R$sphere*$R$sample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

Single Sheet Relative Gain in Table 2 is measured with the sample prisms aligned parallel to the pass axis of the absorbing polarizer. Crossed Sheet Relative Gain in Table 2 is measured with two stacked prism sheets with the prisms aligned perpendicular to each other. The Crossed Sheet Relative Gain result is the average of the brightness of the following two configurations: 1) the top sheet prisms are aligned perpendicular to the pass axis of the absorbing polarizer, and 2) the top sheet prisms are aligned parallel to the pass axis of the absorbing polarizer.

TABLE 2

Brightness Enhancing Film Results

| Film | Resin | Single Sheet Relative Gain | Crossed Sheet Relative Gain |
| --- | --- | --- | --- |
| Comparative A | Composition 1 | 1.76 | 2.73 |
| Example 1 | Composition 2 | 1.80 | 2.87 |
| Example 2 | Composition 3 | 1.79 | 2.84 |

What is claimed is:

1. An optical film comprising a preformed polymeric film base layer and a polymerized microstructured optical layer, the polymerized microstructured optical layer comprising a linear array of regular prisms, the prisms having apex angles ranging from 80° to 100° and peaks with a spacing ranging from 5 to 300 microns wherein the polymerized microstructured optical layer comprises the reaction product of a polymerizable resin composition comprising
zirconia nanoparticles wherein the amount of zirconia nanoparticles ranges from 10 wt-% to 70 wt-%;
5 wt-% to 30 wt-% of one or more first monomers comprising at least two (meth)acrylate groups and two aromatic rings selected from bisphenol or biphenyl (meth)acrylate monomer; and mono(meth)acrylate monomer(s) consisting of one or more second acrylate monomers having the structure

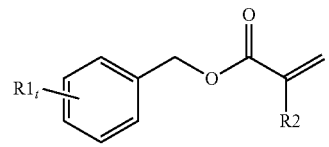

wherein R1 is

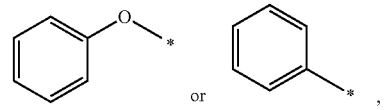

t is 1, and
R2 is hydrogen; and wherein the polymerizable resin comprises at least 10 wt.-% of the second acrylate monomer(s).

2. The optical film of claim 1 wherein the optical film is a brightness enhancing film.

3. The optical film of claim 2 wherein the brightness enhancing film has a single sheet relative gain of at least 1.75.

4. The optical film of claim 1 wherein the polymerizable resin composition is non-halogenated.

5. The optical film of claim 1 wherein the polymerizable resin comprises up to 15 wt-% of one or more first monomers comprising at least two (meth)acrylate groups.

6. The optical film of claim 1 wherein the first monomer comprising at least two (meth)acrylate groups has a molecular weight of at least 350 g/mole.

7. The optical film of claim 1 wherein the second monomer has a refractive index of at least 1.54.

8. The optical film of claim 1 wherein the second monomer has a viscosity of less than 100 cps at 25° C.

9. The optical film of claim 1 wherein the amount of zirconia nanoparticles is no greater than 60 wt-% of the polymerizable resin composition.

10. The optical film of claim 1 wherein the polymerizable resin comprises 30 wt-% to 60 wt-% zirconia nanoparticles.

* * * * *

UNITED STATES PATENT AND TRADEMARK OFFICE
CERTIFICATE OF CORRECTION

PATENT NO. : 9,880,322 B2
APPLICATION NO. : 13/985058
DATED : January 30, 2018
INVENTOR(S) : Bryan Hunt et al.

Page 1 of 1

It is certified that error appears in the above-identified patent and that said Letters Patent is hereby corrected as shown below:

In the Specification

Column 8
Line 26, delete "binapthyl" and insert -- binaphthyl --, therefor.

Column 9
Line 18, delete "dilent" and insert -- diluent --, therefor.
Line 25, delete "napthyl" and insert -- naphthyl --, therefor.
Line 34, delete "napthyl" and insert -- naphthyl --, therefor.

Column 11
Line 31, delete "2,4,6-trimethylbenzoybiphenylphosphine" and insert -- 2,4,6-trimethylbenzoylbiphenylphosphine --, therefor.

Column 17
Line 31, delete "84 C" and insert -- 84° C --, therefor.

In the Claims

Column 22
Line 37, in Claim 1, delete "wt.-%" and insert -- wt-% --, therefor.

Signed and Sealed this
Twenty-eighth Day of May, 2019

Andrei Iancu
*Director of the United States Patent and Trademark Office*